(12) United States Patent
Kimura et al.

(10) Patent No.: US 8,037,488 B2
(45) Date of Patent: Oct. 11, 2011

(54) OPTICAL PICKUP DEVICE

(75) Inventors: Katsuhiko Kimura, Kasumigaura (JP); Hidenao Saito, Yokohama (JP); Jun Hato, Yokohama (JP)

(73) Assignee: Hitachi Media Electronics Co., Ltd., Iwate-ken (JP)

( * ) Notice: Subject to any disclaimer, the term of this patent is extended or adjusted under 35 U.S.C. 154(b) by 590 days.

(21) Appl. No.: 11/526,649

(22) Filed: Sep. 26, 2006

(65) Prior Publication Data

US 2007/0079317 A1 Apr. 5, 2007

(30) Foreign Application Priority Data

Sep. 30, 2005 (JP) ................................. 2005-287951

(51) Int. Cl.
*G11B 7/24* (2006.01)
*G11B 23/03* (2006.01)
*G11B 3/00* (2006.01)

(52) U.S. Cl. ........................................ 720/683; 369/147

(58) Field of Classification Search .......................... None
See application file for complete search history.

(56) References Cited

U.S. PATENT DOCUMENTS

| | | | |
|---|---|---|---|
| 5,768,037 A * | 6/1998 | Marino et al. | 359/824 |
| 6,741,543 B1 * | 5/2004 | Suzuki et al. | 720/683 |
| 2008/0204906 A1 * | 8/2008 | Van Rooij et al. | 359/814 |

FOREIGN PATENT DOCUMENTS

| | | |
|---|---|---|
| JP | 61-271632 | 12/1986 |
| JP | 2003-281765 | 10/2003 |
| JP | 2004-110997 | 4/2004 |
| JP | 2004-171662 | 6/2004 |
| JP | 2004-326885 | 11/2004 |
| JP | 2005-528722 | 9/2005 |
| WO | WO 03/102929 | 12/2003 |

* cited by examiner

*Primary Examiner* — Wayne Young
*Assistant Examiner* — Carl Adams
(74) *Attorney, Agent, or Firm* — Antonelli, Terry, Stout & Kraus, LLP.

(57) ABSTRACT

This invention aims at reducing a rolling moment generated in coils mounted to lens holder side face without losing drive forces in a focusing direction and tracking direction in an objective lens drive of an optical pickup device. By shifting a coil line portion near the objective lens of two coil line portions substantially parallel to the tracking direction of the first coil in a direction departing from a lens optical axis, increase and decrease in drive forces generated in right and left first coils when the lens holder is moved in the tracking direction cancel each other so as to eliminate imbalance between the right and left drive forces.

1 Claim, 7 Drawing Sheets

OPTICAL PICKUP DEVICE

BACKGROUND OF THE INVENTION

1. Field of the Invention

The present invention relates to an optical pickup device including a laser light source, a light receiving portion, objective lens and the like for recording/replaying information to/from an optical disc recording face in an optical disc drive unit.

2. Description of the Related Art

The general objective lens actuating means provided on the optical pickup device of the optical disc recording/replaying apparatus for CD, DVD or the like comprises a movable lens holder equipped with an objective lens, a lens holder supporting member, a focusing coil and a tracking coil fixed to the lens holder, and yoke and permanent magnet disposed opposing these coils. When drive current is applied to the focusing coil, electromagnetic force is generated by action between the current and magnetic flux from the permanent magnet, so that the lens holder is driven in the focusing direction in which it approaches or leaves the optical disc surface. Likewise, when drive current is applied to the tracking coil, electromagnetic force is generated by action between the current and magnetic flux from the permanent magnet, so that the lens holder is driven in the tracking direction which is a radial direction of the optical disk.

An example of the objective lens actuating means including such a structure is described in Patent Document 1. In the objective lens actuating means described in Patent Document 1, a pair of rectangular flat coils are mounted on the side face of a lens holder with a slight gap therebetween and another coil is mounted above the center of the gap between the pair of the coils. At this time, first, the pair of the coils are mounted on the side face of the lens holder and another coil is mounted such that it overlaps part of the pair of the coils. Further, there has been indicated an example in which the three rectangular flat coils are disposed without any overlapping by reducing the dimensions of those coils.

Patent Document 1: Japanese Patent Application Laid-Open No. 2004-326885 (see FIGS. 6, 8, 1, 3, 6)

However, in the structure of the objective lens actuating means described in Japanese Patent Application Laid-Open No. 2004-326885 in which the three rectangular flat coils are mounted such that they overlaps partially each other vertically, the magnetic flux density applied to these coils drops because the first and second coils mounted tightly to the lens holder side face are farther from the third coil, so that the drive force drops, which is a problem to be solved.

Although to avoid such a problem, the dimensions of the three rectangular flat coils are reduced slightly so as not to produce overlapping of these coils in order to bring them close to the magnet equally, no sufficient drive force is secured because the length of each coil is shortened, so that demand for accelerating recording/replay cannot be met, which is another problem to be solved.

Although the magnetic flux density generated from the magnet is substantially equal in the center of the magnet, the magnetic flux density decreases around the magnet. If part of the coil is disposed in the surrounding area of the magnet in which the magnetic flux density drops, the magnitude of the drive force generated in the coil changes when the coil is disposed in the focusing direction or tracking direction, so that rolling moment is generated with respect to the center of the coil. This rolling moment induces an inclination of the objective lens thereby affecting the recording/replay of the optical disc badly.

This phenomenon will be described with reference to an accompanying drawing. FIG. 9 is a diagram showing an arrangement of coils on the lens holder side face and a magnet opposing them in a conventional optical pickup device. In FIG. 9, a pair of first coils 23, a second coil 4 and a permanent magnet 11 are disposed with the positional relation as in FIG. 9 of Japanese Patent Application Laid-Open No. 2004-326885. Because the pair of the first coils 23 are disposed such that the second coil 4 is sandwiched by them, it comes that both the coils 23 are disposed outwardly in the tracking direction (y direction). This indicates the neutral condition in which the coil is not displaced in the focusing direction or the tracking direction.

FIG. 10 shows a condition in which such conventional lens holder is displaced in the tracking direction from a neutral condition. Because the coil line portions 23a, 23b of the first coil 23 approaches from the peripheral portion to the central portion of magnetic pole area of the permanent magnetic pole 11, drive forces Fa', Fb' generated in the coil line portions 23a, 23b increase. On the other hand, the coil line portions 23c, 23d of the first coil 23 leaves from the central portion of the magnetic pole area of the permanent magnetic pole 11 further and consequently, drive forces Fc', Fd' generated in the coil line portions 23c, 23d decrease. Thus, a difference is generated between the drive forces in the focusing direction (z direction) generated in the right and left sides of the first coil 23 in pair, so that rolling moment around the x-axis is generated. The lens holder is inclined by this rolling moment.

To reduce generation of the rolling moment in the conventional lens holder shown in FIG. 9, there is no other way than keeping the first coil 23 in an area in which the magnetic flux density is equal by reducing the dimension of the first coil 23. However, no sufficient drive force can be obtained if the dimension of the coil is reduced as described above. Although the dimension of the permanent magnet 11 needs to be increased in order to keep the first coil 23 in the area in which the magnetic flux density is equal with the dimensions of the first coil 23 not changed, the optical pickup device itself cannot help getting bigger.

SUMMARY OF THE INVENTION

The present invention has been achieved in views of the above-described circumstances and an object of the invention is to provide an optical pickup device capable of reducing rolling moment generated in coils mounted on the lens holder side face without losing drive forces in the focusing direction and tracking direction in the objective lens drive means thereof.

As a result of accumulated researches to solve the above-described problem, the inventor of the present invention has reached an idea that by shifting a coil line portion near the objective lens of two coil line portions substantially parallel to the tracking direction of the first coil in a direction departing from a lens optical axis, increase and decrease in drive forces generated in right and left first coils when the lens holder is moved in the tracking direction cancel each other so as to eliminate imbalance between right and left drive forces.

According to an aspect of the present invention, there is provided an optical pickup device comprising: a lens holder for holding an objective lens for executing recording/replay to an optical disc; a pair of first coils for driving the lens holder in a focusing direction and a second coil for driving the lens holder in a tracking direction, the first coils and the second coil being disposed on each of two side faces of the lens holder, the two side faces being substantially parallel to the tracking direction and focusing direction; a pair of permanent magnets being disposed on the two side faces of the lens holder, respectively, each permanent magnet including four magnetic pole areas divided by a border substantially parallel to the tracking direction and a border substantially parallel to the focusing direction; and means for supplying drive current to the first coils and second coil, wherein each of the first coils has two coil line portions substantially parallel to the tracking direction, each of the permanent magnets is so disposed that the border line of the magnetic pole areas substantially parallel to the tracking direction substantially opposes the center of the two coil line portions of the first coils, and one of the coil line portions near the objective lens is shifted to a side departing from the optical axis of the objective lens in the tracking direction with respect to the other coil line portion.

According to another aspect of the present invention, there is provided an optical pickup device comprising: a lens holder for holding an objective lens for executing recording/replay to an optical disc; a pair of first coils for driving the lens holder in a focusing direction and a second coil for driving the lens holder in a tracking direction, the first coils and the second coil being disposed on each of two side faces of the lens holder, the two side faces being substantially parallel to the tracking direction and focusing direction; a pair of permanent magnets being disposed on the two side faces of the lens holder, respectively, each permanent magnet including four magnetic pole areas divided by a border substantially parallel to the tracking direction and a border substantially parallel to the focusing direction; and means for supplying drive current to the first coils and second coil, wherein each of the first coils has two coil line portions substantially parallel to the tracking direction, each of the permanent magnets is so disposed that the border line of the magnetic pole areas substantially parallel to the tracking direction substantially opposes the center of the two coil line portions of the first coils, and each pair of the first coils are disposed so that an interval between the coil line portions near the objective lens is larger than the interval between the other coil line portions.

According to still another aspect of the present invention, there is provided the optical pickup device wherein of the two coil line portions possessed by each of the pair of the first coils, a part of the second coil is disposed in the interval between the coil line portions near the objective lens.

According to a further aspect of the present invention, there is provided the optical pickup device wherein the second coil has two coil line portions substantially parallel to the tracking direction and of the two coil line portions, the coil line portion near the objective lens is formed longer than the other coil line portion.

In the optical pickup device of the present invention, the first coil may have a substantially parallelogram shape. The first coil may have a substantially trapezoidal shape in which of the two coil line portions, the coil line portion far from the objective lens is longer than the other coil line portion.

According to a further aspect of the present invention, there is provided the optical pickup device wherein a face opposing the permanent magnet of the pair of the first coils and a face opposing the permanent magnet of the second coil are contained in the same plane substantially parallel to the tracking direction and focusing direction.

As described above, the optical pickup device of the present invention can reduce rolling moment generated in a focusing coil accompanying generation of drive force in the focusing coil. As a consequence, inclination of the objective lens can be suppressed to a small level thereby achieving stable recording and replay. Further, the recording/replaying velocity never drops because drive forces of the focusing coil and tracking coil are not lost.

DESCRIPTION OF THE PREFERRED EMBODIMENTS

Figure 1:
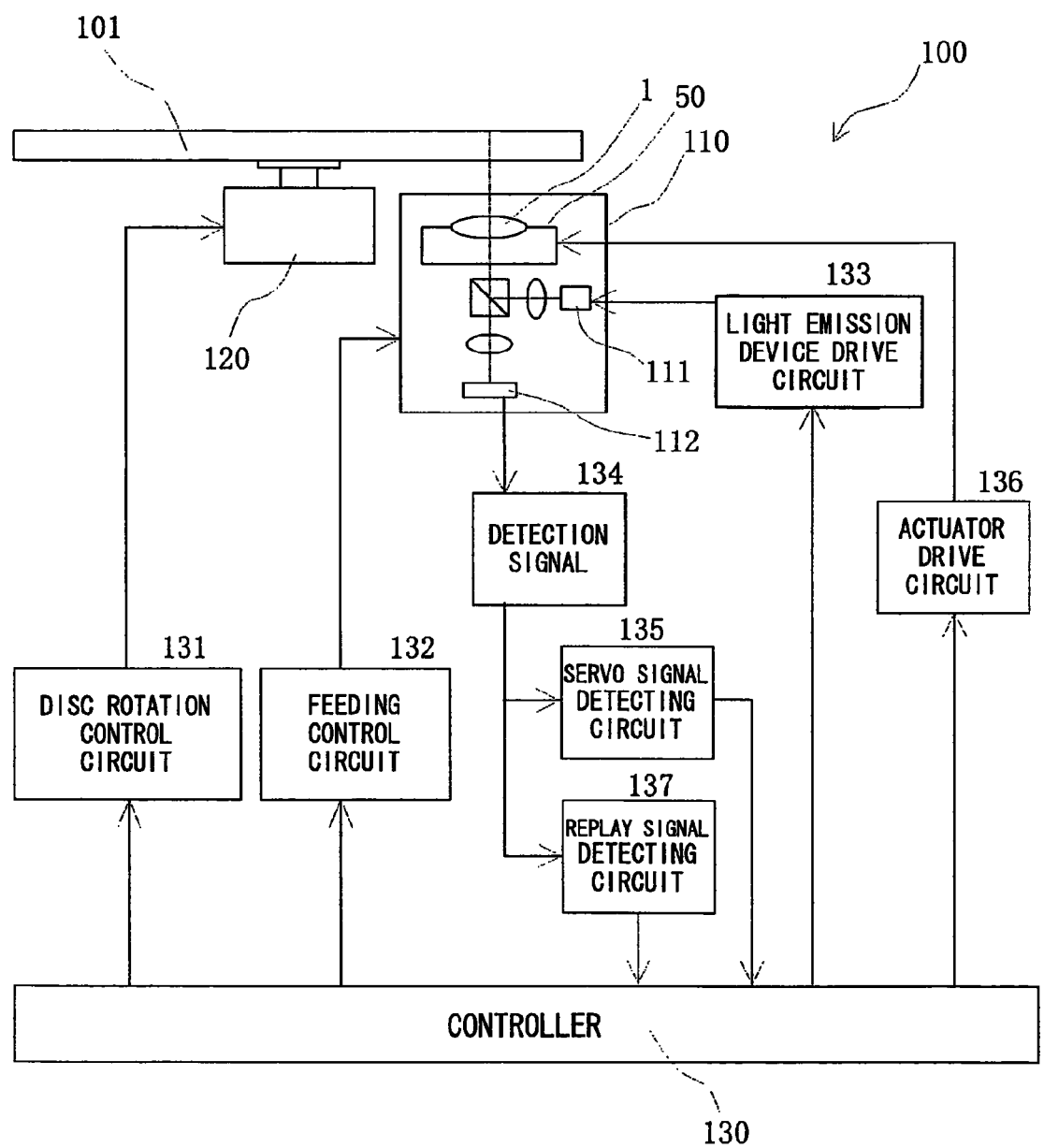
FIG. 1 is a diagram showing the schematic structure of an optical disc recording/replaying apparatus equipped with an optical pickup device of the present invention.

Hereinafter, the preferred embodiments of the optical pickup device of the present invention will be described in detail with reference to the accompanying drawings. FIGS. 1-8 are diagrams for exemplifying the embodiments of the present invention and components having like reference numerals indicate the same ones, which have same basic structure and activity.

The optical disc recording/replaying apparatus 100 includes a spindle motor 120 for rotating an optical disc 101, an optical pickup device 110 for executing recording/replay of information to the optical disc 101 and a controller 130 for controlling these. The optical pickup device 110 comprises an objective lens 1, an objective lens drive means 50, a laser emitting device 111, a light detecting device 112 and the like.

A disc rotation control circuit 131 connected to the controller 130 drives the spindle motor 120 loaded with the optical disc on receiving an instruction from the controller 130. A feeding control circuit 132 connected to the controller 130 moves the optical pickup device 110 in the radial direction of the optical disc 101 on receiving an instruction from the controller 130. The laser emitting device 111 mounted on the optical pickup device 110 is connected to a light emission device driving circuit 133. When a drive signal from the light emission device driving circuit 133 is inputted to the laser emitting device 111, on receiving an instruction from the controller 130, the laser emitting device 111 emits laser beam to the optical disc 101 and this laser beam is focused onto the optical disc 101 by the objective lens 1. The focused laser beam is reflected by the optical disc 101 to pass the objective lens 1 and to impinge upon the light detecting device 112. A detection signal 134 obtained by the light detecting device 112 is inputted to a servo signal detecting circuit 135 and a replay signal detecting circuit 137. The servo signal detecting circuit 135 generates a servo signal based on the inputted detection signal 134 and outputs it to the controller 130. The controller 130 outputs this servo signal to an actuator drive circuit 136 and correspondingly, the actuator drive circuit 136 outputs a drive signal to the objective lens drive means 50 of the optical pickup device 110 so as to execute positioning control of the objective lens 1.

On the other hand, the replay signal detecting circuit 137, after receiving the detection signal 134 from the light detecting device 112, generates a replay signal from this detection signal 134 and outputs it to the controller 130. The controller 130 outputs this replay signal to a replaying portion (not shown) so as to replay information recorded in the optical disc 101.

The respective components described above have the same structure as the conventional optical disc recording/replaying apparatus and provide the same operation and effect. The optical pickup device of the present invention has a feature in having the objective lens drive means 50 different from the conventional technology and hereinafter, the structure and operation of this objective lens drive means will be described in detail.

Figure 2:
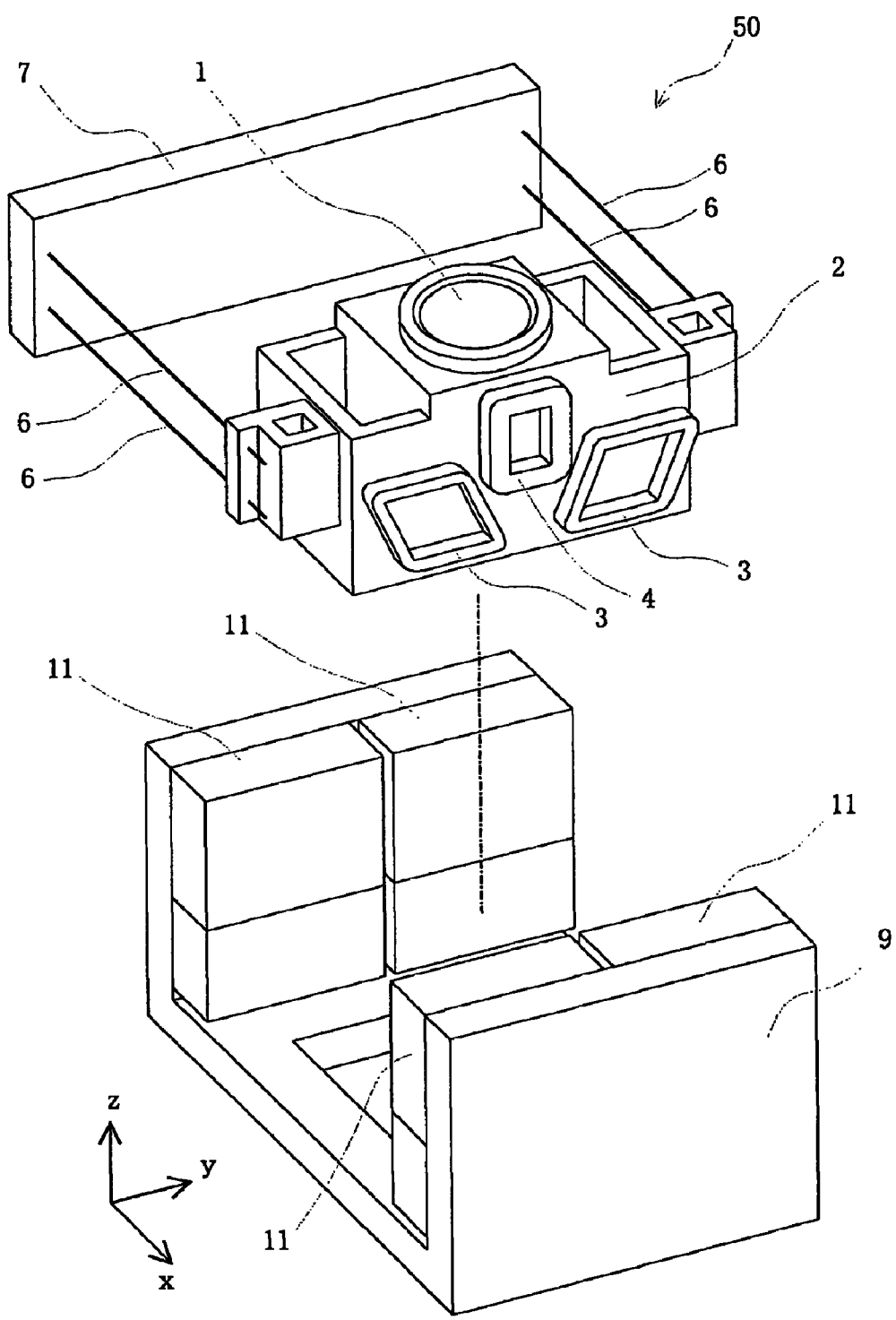
FIG. 2 is an exploded perspective view showing the structure of objective lens actuating means of the optical pickup device of the present invention.

FIG. 2 is an exploded perspective view showing the structure of the objective lens drive means 50 of the optical pickup device 110 of the present invention. In FIG. 2, the drive directions of the objective lens 1 are expressed as x, y, z directions and the z direction is a focusing direction for driving the objective lens 1 such that it approaches or leaves the optical disc recording face along the optical axis of the objective lens 1 and the y direction is a tracking direction for driving the objective lens 1 in the radial direction of the optical disc. The x direction is a direction perpendicular to both the y direction and z direction. In FIG. 2, the objective lens 1 is held by the holder 2. The holder 2 includes a pair of first coils 3 for generating drive force in the focusing direction and a second coil 4 for generating drive force in the tracking direction, those coils being provided on both side faces parallel to the tracking direction. The holder 2 is supported by rod-like supporting members 6 whose ends are fixed to a fixing portion 7. The first coil 3 and second coil 4 are electrically connected to an end of any supporting member 6 through soldering or the like so as to receive electricity through the supporting members 6. Four permanent magnets 11 and yoke 9 are disposed to oppose both side faces parallel to the tracking direction of the objective lens 1 and the holder 2.

Figure 3:
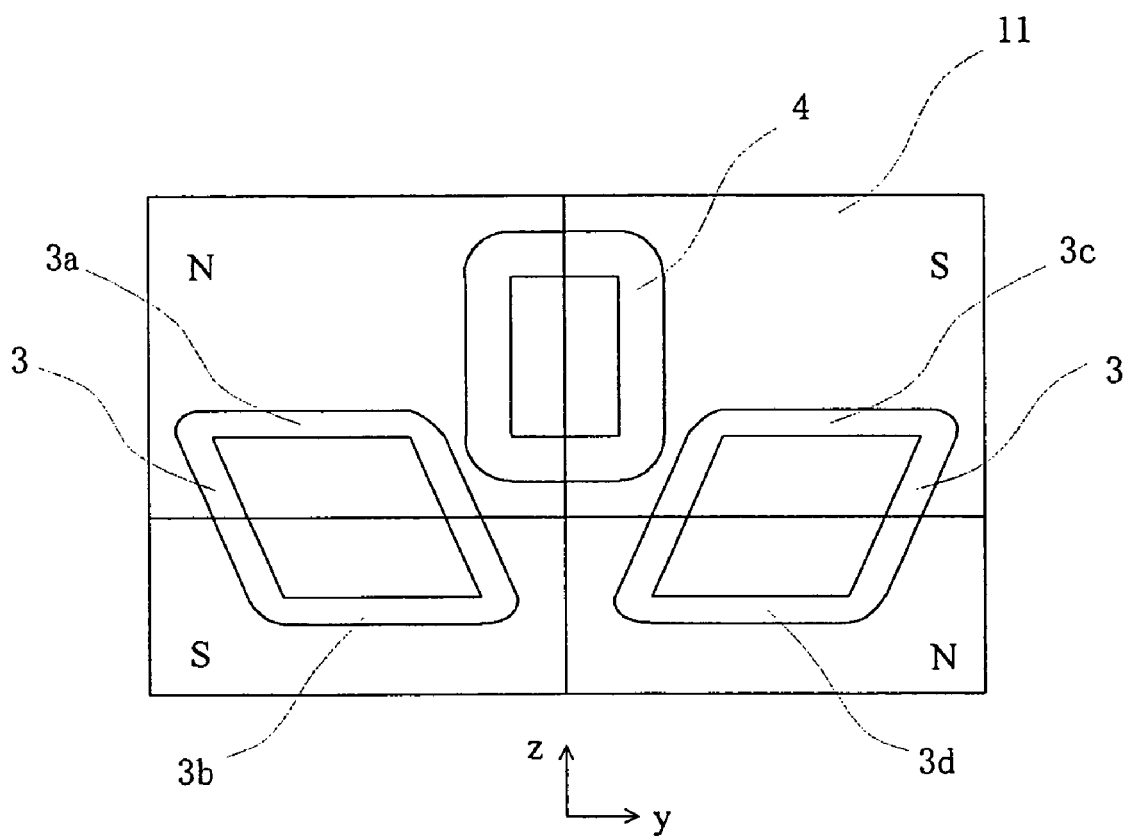
FIG. 3 is a diagram showing schematically the positional relation between a coil group equipped on the holder side face of the objective lens and the permanent magnet disposed opposing the coil group in the objective lens actuating means of the optical pickup device shown in FIG. 2.

FIG. 3 is a diagram showing schematically arrangement of a pair of the first coils 3, the second coil 4 and the permanent magnet 11 on a side face parallel to the tracking direction of the holder 2. In FIG. 3, each of the pair of the first coils 3 has two coil line portions 3a, 3b and 3c, 3d parallel to the tracking direction and the positions of the two coil line portions 3a, 3b and 3c, 3d are shifted in the tracking direction. Each of the pair of the first coils 3 is shaped substantially in a parallelogram. The pair of the first coils 3 are disposed symmetrically with respect to the optical axis of the objective lens 1. Here, of the two coil line portions parallel to the tracking direction of the pair of the first coils 3, an interval in the tracking direction between the coil line portions 3a and 3c near the objective lens 1 is larger than an interval in the tracking direction between the coil line portions 3b and 3d far from the objective lens 1. The part of the second coil 4 is disposed in this larger interval between the coil line portions 3a and 3c of the first coil 3.

On the other hand, a substantially rectangular parallelepiped permanent magnet 11 is magnetized to two poles and two permanent magnets 11 are disposed at positions opposing each side face of the holder 2. As shown in FIG. 3, the surface of the permanent magnet opposing one side face of the holder 2 has four magnetized areas. The pair of the first coils 3 and the second coil 4 are disposed such that they stride across substantially the center of a border between the magnetized areas parallel to the tracking direction and the focusing direction. Although FIG. 2 shows an arrangement having a gap between the two permanent magnets 11 in order to make it understood easily to dispose the two permanent magnets 11 on each side face of the holder, the two permanent magnets may make contact with each other because a face opposing the holder 2 only has to be divided to four magnetized areas. Alternatively, it is permissible to use a single permanent magnet divided to four magnetized areas or dispose four single-pole permanent magnets.

However, if a single permanent magnet is magnetized to four magnetic poles, magnetization may not be achieved sufficiently near a crosswise intersection of their magnetic pole borders so that the magnetic flux density applied to the coil may drop. If the sizes of respective magnetic poles are different as shown in FIGS. 2, 3 when four single-pole permanent magnets are disposed, permanent magnets having a different size needs to be prepared thereby increasing the quantity of components. Contrary to this, if two permanent magnets 11 each magnetized to two poles are used on each side face of the holder, the magnetic pole border can be secured clearly and by using the same components in an inverted condition with respect to each other as adjoining two permanent magnets 11, increase of the quantity of the components can be avoided, which is a better idea than the above-described method.

Figure 4:
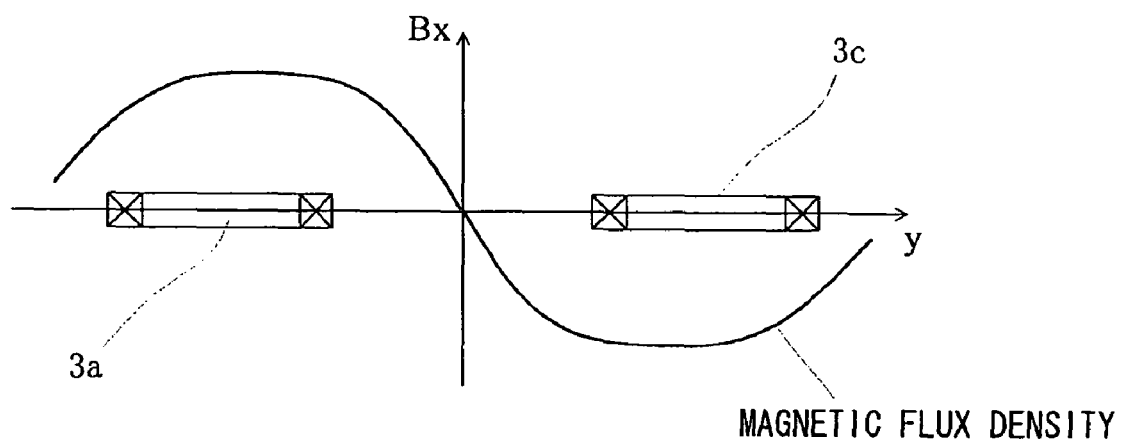
FIGS. 4A and 4B are diagrams showing the distribution of the magnetic flux density acting on the coil group equipped on the holder side face by the permanent magnet in the objective lens actuating means of the optical pickup device shown in FIG. 2.
Figure 4:
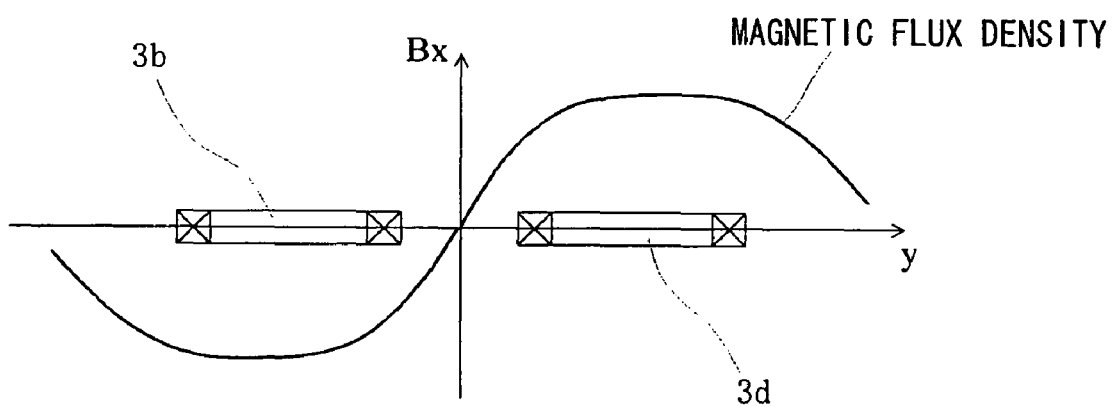

FIG. 4 is a diagram showing the distribution of the magnetic flux density applied to the first coil 3 and the second coil 4 in pair from the permanent magnet 11. Magnetic flux density contributing to the drive force generated in these coils is x-direction component perpendicular to the focusing direction and tracking direction. FIG. 4(*a*) shows x-direction component Bx of the magnetic flux density on the surface of the permanent magnet 11 opposing the coil line portions 3a, 3c in pair of the first coil 3 and the second coil 4. FIG. 4(*b*) shows the distribution of x-direction component Bx of the magnetic flux density on the surface of the permanent magnet 11 opposing the coil line portions 3b, 3d in pair of the first coil 3. As evident from these diagrams, an area in which the magnetic flux density is uniform is a portion opposing the central portion of each rectangular magnetic pole area and the magnetic flux density is small in the peripheral portion of each magnetic pole area.

Figure 5:
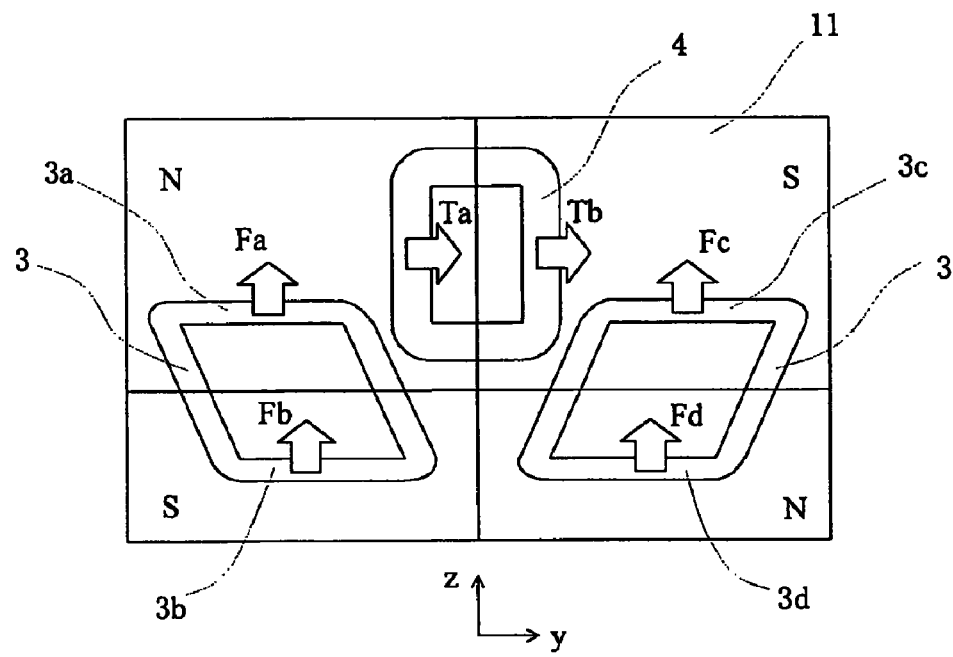
FIG. 5 is a diagram showing drive forces generated in the first and second coils when the objective lens and holder are in a neutral condition in the objective lens actuating means of the optical pickup device shown in FIG. 2.

FIG. 5 is a diagram showing drive force generated in the first coil 3 and the second coil 4 when the objective lens 1 and the holder 2 are in a neutral condition. The neutral condition of the objective lens 1 and the holder 2 means that the first coil 3 and the second coil 4 are located such that they stride across the border between the magnetic pole areas parallel to the tracking direction and the focusing direction substantially at their central positions (condition shown in FIG. 3). When the objective lens 1 and the holder 2 are located in the neutral condition, the coil line portions 3a, 3c of the first coil 3 are located outwardly in the tracking direction with respect to the optical axis of the objective lens 1 in opposing magnetic pole area while the coil line portions 3b, 3d of the first coil 3 are located inwardly in the tracking direction with respect to the optical axis of the objective lens 1 in the opposing magnetic pole area.

When drive current is supplied to each coil in FIG. 5, the first coil 3 generates drive forces Fa, Fb, Fc, Fd perpendicular to the focusing direction in the coil line portions 3a, 3b, 3c, 3d perpendicular to the focusing direction and the second coil 4 generates drive forces Ta, Tb in the tracking direction in the two coil line portions perpendicular to the tracking direction. In this neutral condition, no rolling moment is generated around the x-axis in the lens 1 and the holder 2 because of symmetry of the magnitudes of the drive forces Fa, Fb, Fc, Fd.

Figure 6:
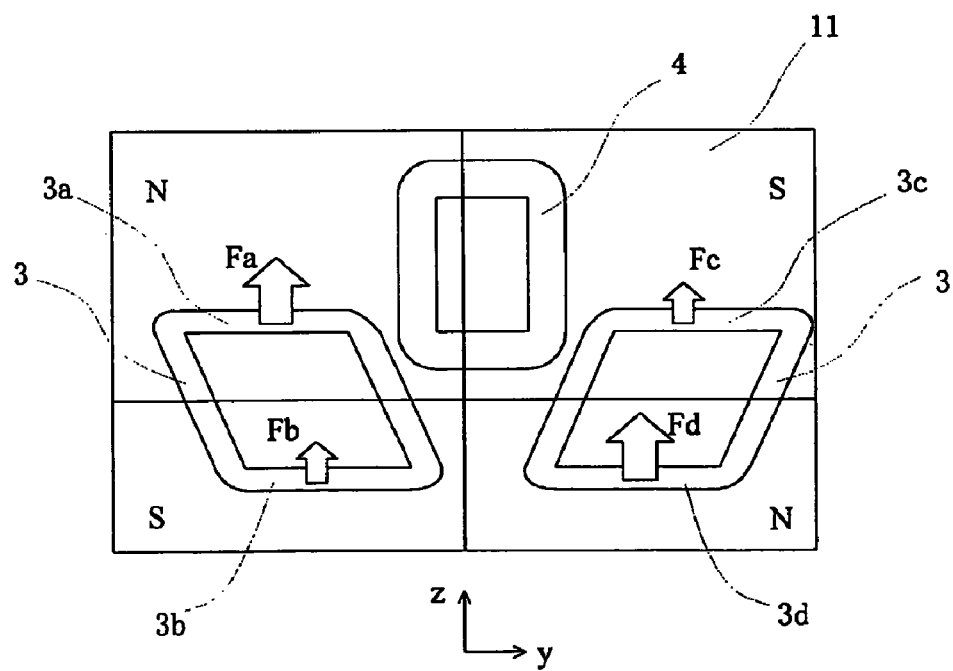
FIG. 6 is a diagram showing a drive force generated in the first coil when the objective lens and holder are moved in the tracking direction from the neutral condition in the objective lens drive means of the optical pickup device shown in FIG. 2.

FIG. 6 is a diagram showing a drive force generated in the first coil 3 when the objective lens and holder are moved in the tracking direction from the neutral condition. When drive current is supplied to the first coil 3 in the same way as described above, drive forces Fa, Fb, Fc, Fd in the focusing direction are generated in the coil line portions 3a, 3b, 3c, 3d perpendicular to the focusing direction. Here, it comes that the coil line portions 3a, 3d of the first coil are moved from the peripheral portion of opposing magnetic pole area to the central portion, so that drive forces Fa, Fd generated in these coil line portions become larger than a value when in the neutral position. Contrary to this, it comes that the coil line portions 3b, 3c of the first coil 3 are moved from the central portion of opposing magnetic pole area to the peripheral portion, so that the drive forces Fb, Fc generated in these coil line portions become smaller than a value when in the neutral position.

Thus, in the optical pickup device 110 and the objective lens drive means 50 of the present invention, the change in the drive force generated entirely in the pair of the first coils 3 can be suppressed to a low level even if the objective lens 1 and the holder 2 are moved in the tracking direction from the neutral condition. Further, an increase in the drive force Fa and a decrease in the drive force Fb in the first coil 3 cancel each other while a decrease in the Fc and an increase in Fd cancel each other. Therefore, changes in the drive force in the right and left first coils 3 are suppressed thereby restricting generation of rolling moment around the x-axis caused by imbalance between the drive forces generated in the right and left first coils 3.

If the coil line portions 3a, 3c of the first coil 3 are disposed outwardly in the tracking direction with respect to the optical axis of the objective lens 1 and the coil line portions 3b, 3d of the first coil 3 are disposed inwardly in the tracking direction with respect to the optical axis, no change in drive force of the entire first coil 3 or no generation of rolling moment around the x-axis occurs when the objective lens 1 and the holder 2 are moved in the tracking direction from the neutral condition even if the lengths of the coil line portions 3a, 3b, 3c, 3d perpendicular to the focusing direction are increased, thereby achieving an effect of increasing the drive force in the focusing direction of the first coil 3.

Additionally, by forming the pair of the first coils 3 substantially in a parallelogram, there is achieved an effect of preventing generation of a difference between a drive force generated on the coil line portions 3a, 3c near the objective lens 1 and a drive force generated on the coil line portions 3b, 3d far from the objective lens 1. By disposing the coil line portions 3a, 3c near the objective lens 1 of the first coil 3 outwardly in the tracking direction with respect to the optical axis of the objective lens 1, as shown in FIG. 3 etc. a wide space can be secured between the coil line portions 3a and 3c, so that part of the second coil 4 can be disposed in this space without overlapping the first coils 3. Consequently, distances between the permanent magnet 11 and the first coil 3/the second coil 4 can be equalized and accordingly, the densities of magnetic flux applied to the first coil 3 and the second coil 4 can be raised equally. Further, the two coil line portions perpendicular to the tracking direction of the second coil 4 can be set longer thereby increasing the drive forces Ta, Tb generated in the second coil 4.

Figure 7:
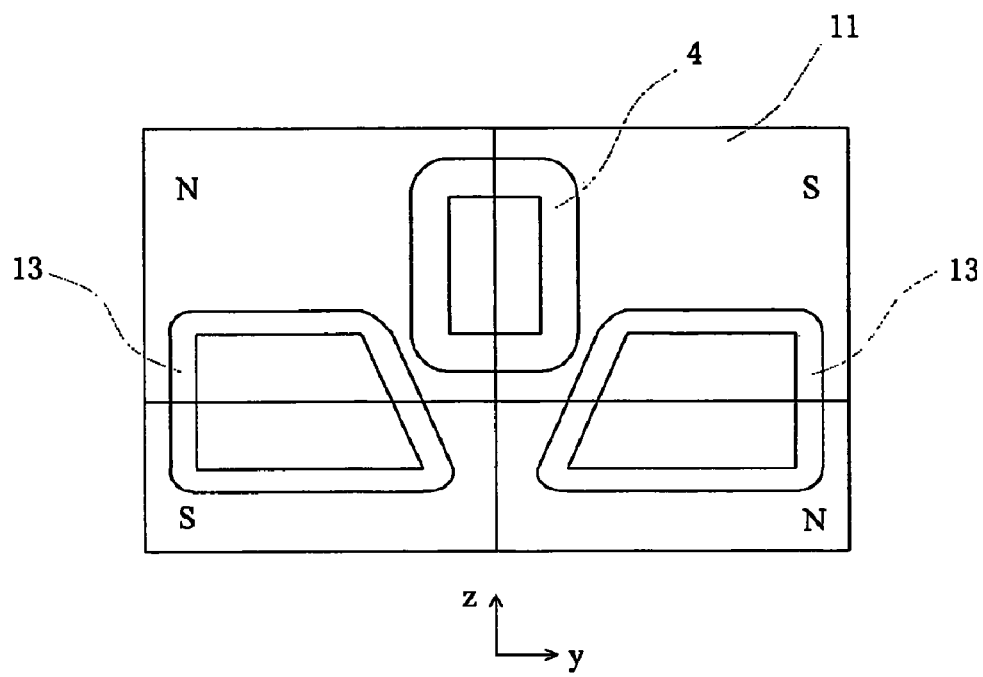
FIG. 7 is a diagram showing an example of arrangement of a coil group equipped on the holder side face of the objective lens in the objective lens drive means of the optical pickup device shown in FIG. 2.

In addition to the above-described matters, the pair of the first coils 13 can be formed into a trapezoidal shape as shown in FIG. 7. Although in this case, when the objective lens 1 and the holder 2 are moved in the tracking direction from the neutral condition, the effect of suppressing generation of rolling moment in the pair of the first coils 13 drops as compared with a case where the coil shape is substantially parallelogram, the coil line portions on the bottom side perpendicular to the focusing direction are prolonged, thereby increasing the drive force generated in the pair of the first coil 13.

Figure 8:
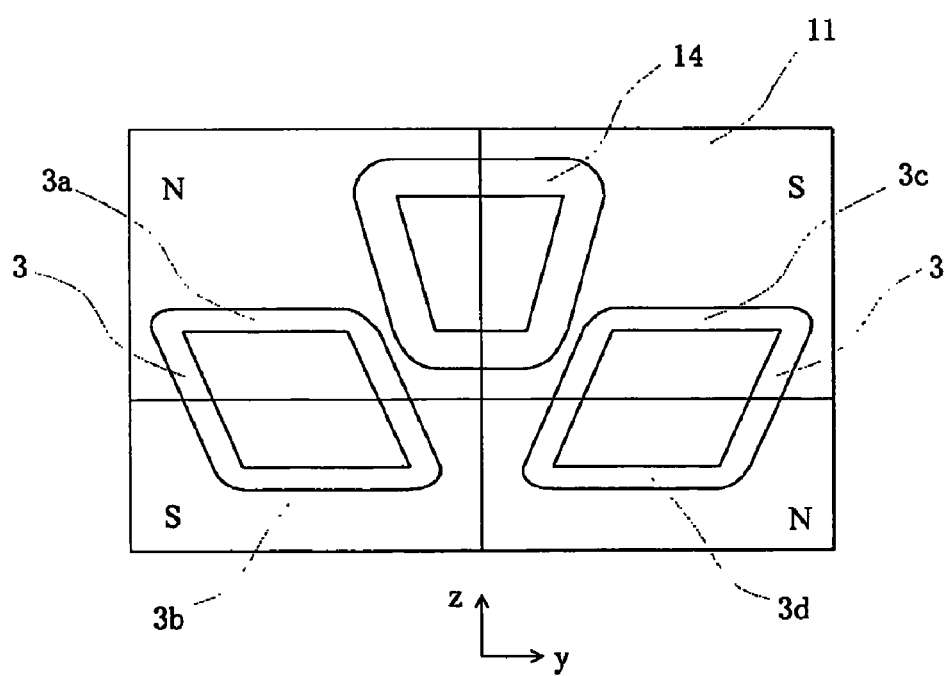
FIG. 8 is a diagram showing an example of arrangement of a coil group equipped on the holder side face of the objective lens in the objective lens drive means of the optical pickup device shown in FIG. 2.
Figure 9:
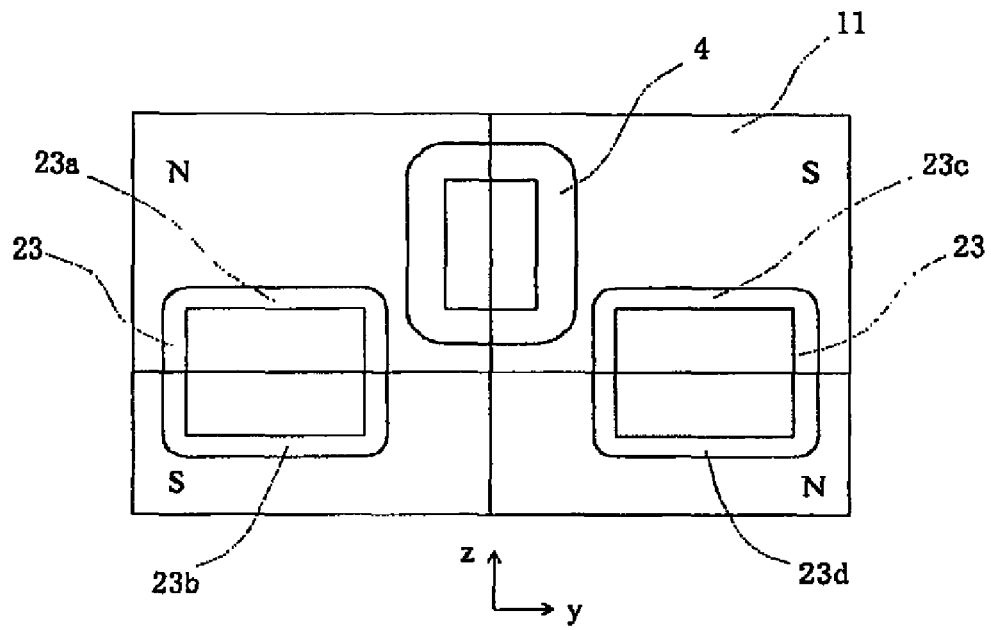
FIG. 9 is a diagram showing arrangement of coils on the lens holder side face and opposing magnet in a conventional optical pickup device.
Figure 10:
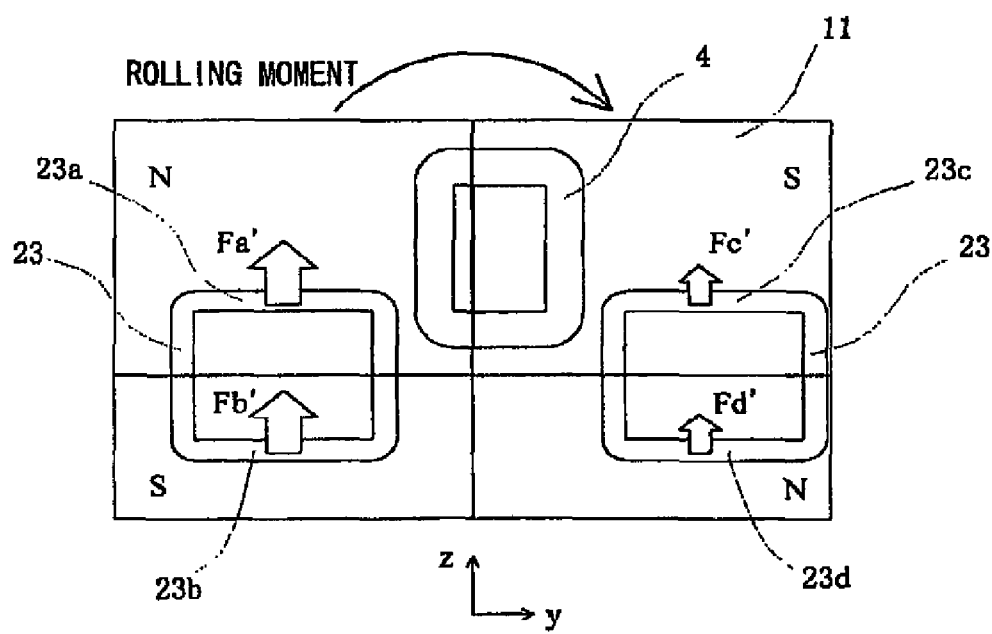
FIG. 10 is a diagram showing a condition in which the conventional lens holder shown in FIG. 9 is displaced in the tracking direction from the neutral condition.

Further, the second coil 14 may be formed into a trapezoidal shape as shown in FIG. 8 and disposed between coil line portions inclined of the pair of the first coils 3. By forming the second coil 14 into the trapezoidal shape, the coil line portions which generates a drive force in the tracking direction can be brought close to the central portion of the permanent magnet 11. As a consequence, the magnetic flux density applied to the coils increases so as to increase the drive force generated in the second coil 14.

The optical pickup device of the present invention has been described by indicating specific embodiments above. However, the present invention is not restricted to these embodiments. Those skilled in the art can change or improve the structure and functions of the respective embodiments and other embodiments within a scope not departing form the spirit of the present invention.

The optical pickup device can be adopted as an optical pickup device for recording and replaying information to/from the optical disc recording face in the optical disc recording/replaying apparatus such as CD, DVD.

What is claimed is:
1. An optical pickup device comprising:
a lens holder for holding an objective lens for executing recording/replay to an optical disc;
a pair of first coils for driving the lens holder in a focusing direction and a second coil for driving the lens holder in a tracking direction, the first coils and the second coil being disposed on each of two side faces of the lens holder, the two side faces being substantially parallel to the tracking direction and focusing direction;
a pair of permanent magnets being disposed on the two side faces of the lens holder, respectively, each permanent magnet including four magnetic pole areas divided by a border substantially parallel to the tracking direction and a border substantially parallel to the focusing direction; and
means for supplying drive current to the first coils and the second coil;
wherein each of the first coils has two first coil line portions substantially parallel to the tracking direction, and two second coil line portions connected to the two first coil line portions,
each of the permanent magnets is so disposed that the border line of the magnetic pole areas substantially parallel to the tracking direction is opposed to the center of the two first coil line portions of the first coils, and the pair of first coils and the second coil are opposed to the magnetic pole areas such that both ends of one of the two first coil line portions near the objective lens is shifted to a side departing from the optical axis of the objective lens in the tracking direction with respect to both ends of the other of the two first coil line portions so that the two second coil line portions extend at an incline with respect to the optical axis and substantially parallel to one another, and the two first coil line portions extend in the direction perpendicular with respect to the optical axis; and wherein each of the first coils has a parallelogram shape.

* * * * *